United States Patent [19]
Bottini et al.

[11] 4,200,677
[45] Apr. 29, 1980

[54] BULLET-PROOF COMPOSITE MATERIAL MOULDABLE INTO FLAT AND CURVED PLATES OR INTO HOLLOW BODIES OF COMPLEX SHAPE

[76] Inventors: Emilio Bottini, Via Volontari della Liberta 5, Busto Arsizio (Varese); Giacomo Mazzer, Ponte Lambro (Como), both of Italy

[21] Appl. No.: 937,580

[22] Filed: Aug. 29, 1978

[30] Foreign Application Priority Data

Sep. 12, 1977 [IT] Italy ................. 27445 A/77

[51] Int. Cl.² ............................................. F41H 1/02
[52] U.S. Cl. .................................... 428/246; 2/2.5; 428/252; 428/257; 428/260; 428/310; 428/911
[58] Field of Search ............. 428/245, 246, 252, 267, 428/911, 257, 260, 310; 2/2.5

[56] References Cited

U.S. PATENT DOCUMENTS

| | | | |
|---|---|---|---|
| 3,486,966 | 12/1969 | Allen et al. | 428/252 |
| 3,516,898 | 6/1970 | Cook | 428/911 |
| 3,577,306 | 5/1971 | Baker et al. | 428/252 |
| 3,801,416 | 4/1974 | Gulbirez | 428/911 |
| 3,924,038 | 12/1975 | McOrdle | 428/911 |
| 3,974,124 | 8/1976 | Pelham | 428/911 |
| 4,027,072 | 5/1977 | Molari | 428/911 |
| 4,057,359 | 11/1977 | Grooman | 428/911 |
| 4,090,005 | 5/1978 | Morgan | 429/911 |

*Primary Examiner*—James J. Bell
*Attorney, Agent, or Firm*—Stevens, Davis, Miller & Mosher

[57] ABSTRACT

A bullet-proof composite material, mouldable into flat and curved plates or into hollow bodies of complex shape, comprises a plurality of identical and/or different cloths of polyamide fibers, at least some of which are of plain weave fabric type and others of twill type, each of which impregnated with unsaturated polyester resins. Said cloth are superimposed individually and/or in groups or units and associated with one another in the desired shape with high pressure.

8 Claims, No Drawings

BULLET-PROOF COMPOSITE MATERIAL MOULDABLE INTO FLAT AND CURVED PLATES OR INTO HOLLOW BODIES OF COMPLEX SHAPE

BACKGROUND OF THE INVENTION

The present invention relates to a bullet-proof composite material, mouldable into flat and curved plates or into hollow bodies of complex shape.

As known, it is a topical problem to protect the life of those who get involved in fire encounters—in war and in peace—from bullets shot at medium and short distance. For this purpose, the police-forces and the armies of various countries have since long intensified the searches for equipping men and means with more and more efficient protections against bullets shot with firearms.

Up-to-date, however, the results obtained can be considered successful only for certain types of firearms and limitedly to certain projectile bores, which is insufficient also for protecting members of the police-forces, considering the spreading around of the use, by the organized underworld or by the terrorists, of projectiles with increasingly larger bores and of more and more refined and powerful weapons.

Furthermore, the solution to the aforespecified problem has often been found in the use of heavy and bulky protective means (such as the typical metallic protections which have long been used in modern armies and which date back to old age, or at least have been inspired by it), which kill the operating ability, the movements and the quickness of those who wear them or of the means onto which they are applied.

For a really modern and efficient solution to the above problem, it was proposed, particularly at the level of bullet-proof jackets and helmets and protective plates for vehicles, to take advantage of the characteristics of some modern cloths made of special synthetic fibers, such as fibers of aromatic polyamide, also referred to as "ballistic nylon" to retain bodies such as bullets launched at high speed thereagainst.

Up-to-date, however, the attempts made in this direction have given unsatisfactory or incomplete results and particularly have required the use of variously processed or treated classic protection materials, typically metallic materials, in association with said cloths, so that as to the known art the availability of efficient means for bullet-proof protection, which would be necessary and are pressingly required by circumstances, is still a long way off.

SUMMARY OF THE INVENTION

Extended studies and experiments have now permitted setting up a bullet-proof composite material which lends itself to various applications (both for typically personal protection—as a garment and implement—and for general protection, as a panel), which material is moldable into both flat and curved plates, and in-to hollow bodies of a more or less complex shape, is light weight (much lighter than any other at present known material and usable for the same purposes) and has a unique capacity of opposing the penetration of bullets (not only of small bore and shot but by powerful and modern weapons).

Such a material is essentially characterized by comprising a plurality of identical and/or different cloths of fibers of aromatic polyamide (ballistic nylon), at least some of which are of plain weave fabric type and others of twill type, each of which impregnated with unsaturated polyester resins or mixtures thereof superimposed individually and/or in groups and associated with one another in the desired shape, by high pressure.

DESCRIPTION OF THE PREFERRED EMBODIMENT

In a preferred embodiment, only plain weave fabric type of cloths and twill type of cloths are used, impregnated or mixture thereof overlying the groups or units of plain weave fabric cloths to those of twill cloths, taking care of arranging the twill cloths with the warp of each of such cloths oriented as the weft of the adjacent ones and then moulding at a pressure not lower than 45 kg/sq.cm and temperatures between 70° and 130° C.

Good results have been achieved by carrying into effect this embodiment of the material according to the invention with a group or unit, intended to be externally positioned for receiving the bullet impact, of some identically impregnated fabric type ballistic nylon cloths, and a group or unit, intended to be internally positioned, on the side of the person or object to be protected, of an inferior number of identically impregnated twill type ballistic nylon cloths, each cloth oriented at 90° relative to the adjacent cloth.

The high pressure molding of the material according to the invention allows to give such a material both extremely simple forms or shapes, such as those of flat or curved plates (suitable for forming panels, shields, garment sections as corsets, jerkin and the like), and complex shapes, such as hollow bodies (suitable for forming other protections or protective garments, typically helmets or the like).

Generally, cloth impregnation is carried out with an amount of resins varying between 10% and 30% by weight of the finished product, while the moulding pressure is higher than 60 kg/sq.cm at a temperature between 80° and 110° C.

The bullet-proof material being provided is rigid, compact and lightweight and can be supplied in any desired shape.

It can be used either alone or associated with other materials, depending on the uses for which it is intended, but it is important to clearly point out that in any case it is capable alone of performing its bullet-proof function.

Generally, the material according to the invention will be associated with an inner substratum of foamed material when helmets are moulded therefrom. In such a case, it will be advantageous to interpose between said material and foamed material a layer of polycarbonate in order to reduce the effects of strikes produced by the impact of bullets (haematomas and the like). The association of these materials can be obtained both by gluing and riveting.

In addition to helmets, the association with a foamed material and in case polycarbonate could be comtemplated also for other uses, particularly for parts of garments, such as corsets and the like, and also for shields and the like.

It is further apparent that when desiring to enhance the performances of the material according to the invention, such a material could be associated with an outer metallic coating or lining (for example, a titanium plate).

Of course, this can be done only where an (even considerable) increase in weight is admissible and recommended by the improved efficacy being obtained, for example in case of protective panels (for buildings, motor-vehicles, shops) and shields.

A merely illustrative and by no way limiting example of the material according to the invention is now given for the only purpose of a better explanation of the essence and features of the invention.

EXAMPLE

A plate or helmet of material according to the invention comprises an external group or unit of ten identical plain weave fabric type cloths of ballistic nylon, of the type commercially referred to as "Kevlar", impregnated with unsaturated polyester resin in an amount of 16–24% by weight of the finished product, and an internal group or unit of four identical twill type cloths, also in "Kevlar", impregnated like the cloths of the former group or unit, and so arranged as to alternatively overlay weft and warp. The plate or helmet have been moulded by applying to the superimposed cloths a pressure higher than 60 kg/sq.cm with a temperature of between 80°–110° C.

Such a material is not pierced by 9 bore NATO parabellum and M 38 bullets shot by sub-machine gun M12 or rifle MAB at a distance of 5 meters.

Should the inner group or unit be made up of five instead of four twill cloths, the behavior of the material would be improved.

Although difficult to supply a complete and convincing explanation of the reasons why such a structure as that disclosed in this example gives the excellent results that have been found, it is deemed that the determinant motive is the combination of an outer layer of cloths having a rigid thin weft, on which the bullet impact occurs, with an inner layer of resilient cloths, to which the effect can be assigned of "restraining" the bullets.

This being stated, it should be clearly pointed out that depending on the purposes to be attained, that is the type of protection to be ensured, type of bullet to be defended against, type of weapons by which the bullets are shot and further important variables, it may be required to vary even to a considerable extent the type, number, combination, quality, weight, treatment and impregnation of ballistic nylon cloths to be used, of course in addition to the processing of the material, particularly pressure and temperature used for molding thereof.

It should also be noted that "batavia" type of cloth could be replaced by other types of cloth, having particular characteristics of uni- or bidirectional elongation.

Therefore, it is to be understood that other embodiments of the bullet-proof material different from those herein described, would be within the scope of the present invention.

What we claim is:

1. A bullet-proof composite material, moldable by high pressure into flat and curved plates or into hollow bodies of complex shape, the material comprising a plurality of cloths of aromatic polyamide fibers superimposed on each other, at least some of which are of plain weave fabric type and others of twill type, each being impregnated with at least one unsaturated polyester resin.

2. A bullet-proof material according to claim 1, wherein the cloths are arranged so that the warp of each of said cloths is oriented to the weft of the adjacent ones, the pressure of molding being at least 45 kg/sq.cm at temperatures of between 70° and 130° C.

3. The bullet-proof material according to claim 2, wherein the cloths are in groups of plain weave fabric and twill, said plain weave group being externally positioned for receiving the bullet impact and said twill group being internally positioned on the side of the person or object to be protected, each cloth being oriented at 90° relative to the adjacent cloth.

4. The bullet-proof material according to claim 3, wherein the amount of resin varies between 10% and 30% by weight of the finished product and the molding pressure is higher than 60 kg/sq.cm at a temperature of between 80° and 110° C.

5. The bullet-proof material according to claim 1, associated with a substratum of foamed material.

6. The bullet-proof material according to claim 5, comprising a layer of polycarbonate interposed between said bullet-proof material and foamed material.

7. The bullet-proof material according to claim 1, associated with an outer plate, preferably a metallic plate.

8. The bullet-proof material according to claim 4, molded at a pressure exceeding 60 kq/sq.cm at temperatures of between 80° and 110° C. having ten identical Kevlar plain weave fabric cloths and at least four twill Kevlar cloths superimposed on one another with a phase displacement of 90°, each cloth being impregnated with at least one unsaturated polyester resin in an amount of between 10% and 30% by weight of the finished material.

* * * * *